US006676837B2

(12) United States Patent
Keeton, Jr.

(10) Patent No.: US 6,676,837 B2
(45) Date of Patent: Jan. 13, 2004

(54) SOLAR AERATION SYSTEM

(76) Inventor: Jimmie A. Keeton, Jr., 2312 Northridge Ct., Fort Collins, CO (US) 80521

( * ) Notice: Subject to any disclaimer, the term of this patent is extended or adjusted under 35 U.S.C. 154(b) by 27 days.

(21) Appl. No.: 09/993,246

(22) Filed: Nov. 13, 2001

(65) Prior Publication Data

US 2002/0104807 A1 Aug. 8, 2002

Related U.S. Application Data

(60) Provisional application No. 60/267,354, filed on Feb. 7, 2001.

(51) Int. Cl.[7] .............................. C02F 1/78; C02F 7/00
(52) U.S. Cl. .................. 210/620; 210/747; 210/760; 210/170; 210/220; 261/77; 261/122.1
(58) Field of Search ................. 210/620, 747, 210/760, 170, 220; 261/121.1, 122.1, 77

(56) References Cited

U.S. PATENT DOCUMENTS

| | | | | |
|---|---|---|---|---|
| 3,320,928 A | * | 5/1967 | Smith ................... 261/121.1 |
| 3,505,213 A | * | 4/1970 | Anthony et al. ........... 210/170 |
| 3,626,901 A | | 12/1971 | Englesson .................... 119/3 |
| 3,956,432 A | | 5/1976 | Hilling ....................... 261/30 |
| 4,258,661 A | | 3/1981 | Margen ........................ 119/3 |
| 4,622,139 A | | 11/1986 | Brown ....................... 210/170 |
| 4,657,675 A | | 4/1987 | Zan ........................... 210/170 |
| 4,906,359 A | | 3/1990 | Cox, Jr. ...................... 210/170 |
| RE33,899 E | | 4/1992 | Tyer .......................... 210/220 |
| 5,133,862 A | | 7/1992 | Cannan et al. .......... 210/321.75 |
| 5,330,688 A | | 7/1994 | Downs ..................... 261/122.2 |
| 5,340,508 A | * | 8/1994 | Thompson ................ 261/122.1 |
| 5,422,043 A | | 6/1995 | Burris ...................... 261/122.1 |
| 5,755,976 A | | 5/1998 | Kortmann .................. 210/747 |
| 5,874,001 A | * | 2/1999 | Carter ....................... 210/620 |
| 5,938,983 A | | 8/1999 | Sheaffer et al. .......... 261/122.1 |
| 6,017,020 A | | 1/2000 | Baughman et al. ......... 261/36.1 |
| 6,017,022 A | | 1/2000 | Shirtum ....................... 261/75 |
| 6,076,812 A | | 6/2000 | Lisi ............................. 261/92 |
| 6,103,123 A | | 8/2000 | Gantzer ..................... 210/605 |
| 6,125,778 A | | 10/2000 | Rodden .................... 114/74 R |
| 6,159,371 A | * | 12/2000 | Dufay ........................ 210/170 |
| 6,193,220 B1 | | 2/2001 | Kelly ........................ 261/23.1 |
| 6,200,468 B1 | | 3/2001 | Schmit et al. .............. 210/137 |
| 6,284,138 B1 | * | 9/2001 | Mast ......................... 210/170 |

* cited by examiner

*Primary Examiner*—Christopher Upton
(74) *Attorney, Agent, or Firm*—The Law Offices of William W. Cochran, LLC (57) ABSTRACT

The present invention is a solar powered aeration system that incorporates a battery. The device can be used for improvement of water bodies for use in aquaculture systems, reservoirs, water storage tanks, fish tanks, artificial ponds and lakes, and the like. The device does not require connection to the electrical power grid and may be used in any location. Further, the device can be used during periods of low oxygen content, which is typically the period of day just before sunrise. Additionally, the device uses a laminar column of water to enhance circulation of the water body. Increased efficiency can be obtained by matching the diffuser to the pump size, which is important in solar powered applications.

16 Claims, 6 Drawing Sheets

SOLAR AERATION SYSTEM

CROSS REFERENCE TO RELATED APPLICATIONS

The present invention is based upon and claims priority from U.S. provisional application Serial No. 60/267,354 filed Feb. 7, 2001 entitled "Solar Aeration System," by Jim Keeton.

BACKGROUND OF THE INVENTION a. Field of the Invention

The present invention pertains generally to aeration systems used in water bodies and more particularly to solar powered aeration systems that incorporate a power storage battery.

b. Description of the Background

It is well known that forced aeration of aqueous bodies has beneficial effects. Aeration promotes desirable fish, plant, and microbial organisms while reducing algae growth. Further, active gaseous aeration can reduce phosphorous, iron, and nitrogen in eutrophic water bodies as well as water reservoirs and storage tanks.

Sufficient oxygen concentration in water on the order of 5 ppm or higher is essential for efficient aquaculture of fish and other marine animals. Fish do not feed well at low oxygen concentrations and will die from prolonged exposure to oxygen levels as low as 0.5 ppm. It is common for fish farmers to use aeration systems of various sorts to improve the fish habitat and increase production. These devices may be simple paddle wheels that aerate water by splashing and slinging water into the air or by diffusers of various sorts supplied by air pumps at predetermined depths or at the bottom of the water body.

In eutrophic water bodies, such as a pond or lake, the oxygen levels shift dramatically throughout the day. During the day, sunlight promotes circulation of the water that increases the oxygen content. However, at night, the circulation is halted and the oxygen levels decrease. Thus, the period of lowest oxygen levels are typically the hours just before and after daybreak. Artificial aeration systems can be used to enhance oxygen levels at such periods. A limitation of prior art in solar powered systems is that the aeration only occurred during periods of sunshine, which is the period that the aeration is least needed.

Oxygenation by aeration is used in various sewage treatment processes wherein high oxygen level is essential to the growth of beneficial microbes. Further, active aeration forces water circulation essential to efficient sewage treatment. The circulation has added benefits of outgassing unwanted compounds and precipitating other harmful compounds. An excellent discussion of this practice is taught in U.S. Pat. No. 3,956,432 to Hilling which is specifically incorporated herein by reference for all that it discloses and teaches.

Aeration can be used as a method of increasing the health of a pond or lake. Algae growth can be halted by increasing oxygen levels and the aeration process can precipitate iron from the water and offgas $H_2S$, $CO_2$, $NH_4$, as well as other detrimental compounds from the water. The use of a forced aeration system can restore a water body to health by reestablishing the proper nutrients necessary to sustain aquatic life.

One of the practical limitations of conventional aeration systems is the requirement for a power source. For locations away from the electrical power grid, such as a remote lake, the cost of supplying power in the form of either electrical power lines or a remote generator is prohibitive. Further, the power supply results in a high recurring cost.

Oxygen levels in a lake or other eutrophic water body can become stratified, with water at the top having higher oxygen content than the water at the bottom. For the fish farmer desiring to more efficiently produce fish, the stratification of the lake makes a large portion of the lake less productive. Some prior art, such as U.S. Pat. No. 4,906,359 to Cox, Jr., which is specifically incorporated herein by reference for all that it discloses and teaches, only provide aeration to the top layer of a water body and do not promote the oxygenation of the entire lake.

In wintertime, ice may cover a body of water and further compromise the oxygen levels, since no oxygen is being introduced to the body of water. Since the water is not aerated during the period that the ice covers the body of water, low oxygen levels can result in fish kill since the water body is effectively sealed from any further oxygenation. Bottom aeration in the winter months may prevent permanent ice formation.

Aeration systems comprising air pumps generally force air into the body of water and have some mechanism for dispersing the air into the water. An excellent history of prior art in this area is found in U.S. Pat. No. RE 33,899 to Tyer, which is specifically incorporated herein by reference for all that it discloses and teaches. The Hilling patent teaches a device for use in a man made pool for water treatment and discusses a manifold system that lays in the bottom of the pool for aeration.

The use of solar power for aeration has limitations in that the cost of the solar panels tends to be high with respect to the power output. In order to make better use of the high cost of the solar panels, the most efficient aeration system should therefore be employed. It is well known that laminar flow of a water column comprised of fine bubbles is the most efficient method of transferring oxygen into a body of water. Increasing the depth of the water column source further increases the oxygen transfer.

It would therefore be advantageous to provide an aeration system that can operate at predetermined times to coincide with the periods of low oxygen in a water body. Further, a solar powered system could be used in remote locations or where the operator would like to avoid a continual operating cost and also avoid the capital cost of electrical power line installation. Also, it would be advantageous to provide aeration from the bottom of a water body that is able to circulate and destratify the water contained therein. Further, the use of a laminar flow water column of fine bubbles would be advantageous to maximize efficiency. The use of fine bubbles maximizes the oxygen transfer to the water, which is advantageous in solar applications. Matching the compressor size, the depth of the water body, and the diffuser size further enhances the overall efficiency of the system.

SUMMARY OF THE INVENTION

The present invention overcomes the disadvantages and limitations of the prior art by providing a solar powered aeration system for water bodies that includes an electrical battery for either continuous operation or operation at periods where the oxygen level is at its lowest, such as at night. Further, the solar powered system can be used without attachment to the power grid and without an energy source that must be replenished, such as propane, gas, or other power source.

The present invention may comprise a controller that can operate the device only at predetermined periods of low oxygen levels. The controller may further comprise an oxygen sensor that provides direct feedback to the controller for keeping the water's oxygen levels above a certain point.

The present invention may have an optional oxygen generator attachment that increases the oxygen absorption of the water significantly. Further, an ozone generator may be installed in place of or in addition to the oxygen generator, significantly increasing oxygen absorption.

The present invention utilizes a laminar flow column of fine air bubbles to maximize oxygen transfer. Further, the laminar flow column enhances circulation more so than a turbulent flow diffuser because more water is entrained in the rising column of air bubbles. The laminar flow column is formed by matching the diffuser capacity, the air compressor capacity, and the pressure drop of the air line in such a manner that the air bubble and water column from the diffuser is laminar.

The location of the diffuser at the bottom of the body of water, coupled with the efficient circulation of the laminar flow column, effectively destratifies the body of water. Destratified water minimizes areas of the body of water that are less likely to support aquatic life, increasing the capacity of the body of water to support fish and other desirable life forms.

All of the electrical components, including any control devices, are mounted on the shore of the body of water, and the only part of the system in the water is the diffuser and the air line attached thereto. Since the components are located on the shore, they are easy to service and require less protection than if they were mounted on a floating platform or underwater. The solar panel especially benefits from mounting on land, since the mounting apparatus may be firmly fixed to the ground and therefore remains stable during high winds or other weather. Further, land based solar panels may be attached to a sun tracking device for increased power output.

The present invention may therefore comprise a solar powered device for aerating a body of water comprising: one or more solar power source being electrically connected to one or more batteries being electrically connected to one or more air compressors, the power sources, the batteries, and the compressors being mounted outside of the body of water, and one or more diffusers that are pneumatically connected to the compressor, the diffusers being mounted in the body of water.

The present invention may further comprise a solar powered device for aerating a body of water comprising: one or more solar power sources being electrically connected to one or more batteries being electrically connected to one or more air compressors, one or more oxygen generators being electrically connected to the batteries and pneumatically connected to the air compressors, the power sources, the batteries, the compressors, and the oxygen generators being mounted outside of the body of water, and one or more diffusers that are pneumatically connected to the oxygen generators, the diffusers being mounted in the body of water.

The present invention may further comprise a solar powered device for aerating a body of water comprising: one or more solar power sources being electrically connected to one or more batteries being electrically connected to one or more air compressors, one or more ozone generators being electrically connected to the batteries and pneumatically connected to the air compressors, the power sources, the batteries, the compressors, and the ozone generators being mounted outside of the body of water, and one or more diffusers that are pneumatically connected to the ozone generators, the diffusers being mounted in the body of water.

The present invention may further comprise a solar powered device for aerating a body of water comprising: one or more solar power sources being electrically connected to one or more batteries being electrically connected to one or more air compressors, one or more oxygen generators being electrically connected to the batteries and pneumatically connected to the air compressors, and one or more ozone generators being electrically connected to the batteries and pneumatically connected to the oxygen generators, the power sources, the batteries, the air compressors, the oxygen generators, and the ozone generators being mounted outside of the body of water, and one or more diffusers that are pneumatically connected to the ozone generators, the diffusers being mounted in the body of water.

The advantages of the present invention are the efficient aeration of water bodies without connection to the electric power grid or to an energy supply that requires replenishment, such as gas, propane, or other energy sources. Further, the present invention has a compressor and diffuser that are matched to produce laminar flow of a column of fine bubbles and water that maximizes oxygen absorption and water circulation at the highest efficiency possible. The diffuser for the present invention is located at the bottom of the body of water, further maximizing circulation and oxygen transfer. The present invention may be outfitted with an oxygen generator and/or an ozone generator for further increasing the efficiency of the oxygen transfer.

DETAILED DESCRIPTION OF THE INVENTION

Figure 1:
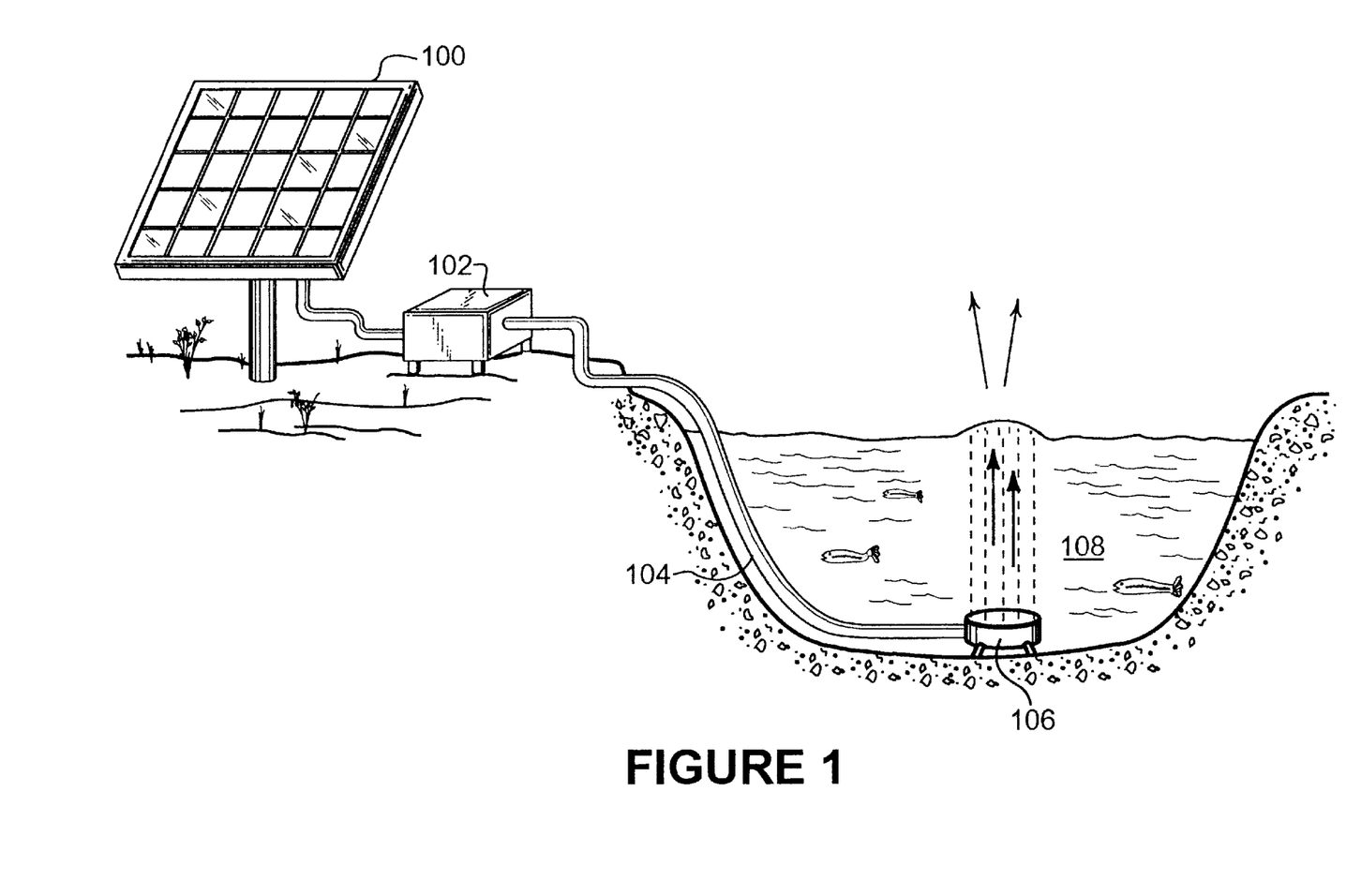
FIG. 1 is a representation of an embodiment of the inventive aerator.

FIG. 1 is a representation of an embodiment of the inventive aeration system. The basic components are the solar panel 100, a control box 102, a length of air pipe 104, and a diffuser 106. The basic function of the system is to release gas into the bottom of the lake 108 such that bubbles form and rise to the surface. The gas may be simply compressed air or may have a high oxygen or ozone content to promote oxygenation of the water.

The solar panel 100 may be a fixed mounted panel or may be an actively tracking panel. The tradeoff is a purely economic one. When the solar cell is pointed at the sun, it is more efficient, since more solar energy impinges on the cell. Thus, a fixed mounted solar panel only reaches a maximum efficiency at one point during the day. The cost tradeoff is between the cost of a tracking system, including the mechanism, controller, and additional solar cells required to power the tracking system verses the cost of additional fixed mounted solar cells to make up for the inefficiency of the fixed mounted position. The efficiencies of the solar panels and the cost tradeoffs may change based on latitude. A manufacturer of fixed mounted solar panels is Unirac, Incorporated of Albuquerque, N. Mex. A manufacturer of auto-tracking solar panels is Zomework, Incorporated, Albuquerque, N. Mex.

The control box 102 contains the electronic controls, a battery, and the gas processing equipment. The electronic controls may comprise power handling devices and a controller for turning the system on and off. The gas processing equipment may be simple compressor and may also include an oxygen generator and may include an ozone generator. Further, the gas processing equipment may also include filters, flow meters, and other gas preparation devices.

The air pipe 104 may be any of several types of pipe. The pipe may be conventional PVC, polypropylene, or other plastic tubing that is externally weighted with bricks or rocks to keep it submerged. The pipe may alternatively be made of metal, preferably a metal that does not corrode, such as stainless steel or galvanized steel. The pipe may be of any composition whatsoever and may be configured in any manner so long as air is communicated from the control box 102 to the diffuser 106.

Preferably, however, a hose material can be used that has been developed specifically for underwater aeration systems that comprise a flexible PVC material that has been loaded with a weighting material to increase the specific gravity of the material to in excess of 1.5. Additionally, the hose geometry is designed so that the hose will remain on the bottom of a body of water even when pressurized with air. Such a hose does not need to be separately weighted due to its intrinsic weight. Further, the self-weighted hose may be simply unrolled from a reel and let to fall into the body of water when installing an aeration system and is flexible so that it conforms to the bottom surface of the water reservoir. An example of a self-weighted hose is model AWFT-1, manufactured by Keeton Industries, Fort Collins, Colo.

The bubbles interact with the water by dissolving oxygen into the water. Adding an oxygen generator to the control box 102 can dramatically enhance oxygen transfer. Further, adding an ozone generator that adds a small amount of ozone to the gas will also enhance oxygen transfer. The oxygen generator may be used with or without an ozone generator. The ozone generator may be used with or without an oxygen generator. The combination depends on the desired amount of oxygenation required for a specific application.

The diffuser 106 may be any of several types of devices attached to the end of air pipe 104. A small bubble diffuser such as a conventional expandable membrane diffuser may be used. Alternatively, a ceramic or metal air stone diffuser or even an open end of the pipe 104 would be sufficient to allow gas to escape into the lake 108.

However, laminar flow of bubbles has been found to be the most efficient method of supplying air to a water reservoir for the purposes of circulating water and enhancing oxygen transfer from the bubbles to the water. Laminar flow has the advantages of small bubbles, which increases oxygen transfer due to the larger proportion of surface area to the volume of the bubble, and the bubbles travel slower through the water, giving more time for the oxygen transfer process. Turbulent or slug flow allows the bubbles to coalesce and thereby significantly decreases oxygen transfer. The present invention can be employed with either laminar flow or slug flow applications. However, due to the requirements of efficiency that are inherent in solar cell systems, in general it is desirable to have a system that maximizes efficiency. Further efficiency can be realized by matching the compressor size, air pipe size and length, diffuser size configuration, and depth to minimize backpressure while still creating bubbles that are sufficiently small to create a laminar flow and provide a high degree of oxygen absorption.

In general, both laminar flow and slug flow can be achieved through conventional expandable membrane diffusers, with the primary difference being that laminar flow is generally achieved with a lower volume of air delivered per unit time to a selected size of diffuser. The system of the present invention is designed to use a diffuser that is capable of creating small bubbles but is sufficiently large to minimize backpressure and, hence, maximize efficiency of the system. The overall surface area of the diffuser, the orifice size of the membrane, the spacing of the membrane orifices, the depth of use, the compressor size, the length of pipe and other criteria are all balanced to maximize efficiency and create a laminar flow. For example, a diffuser used at a greater depth may require a wider spaced orifice pattern to prevent coalescing of the bubbles during their ascent in the water body. In another example, the plenum size of the diffuser may be adjusted so as to match the backpressure to the performance region of maximum efficiency for the compressor. In another example, the volume of compressed air produced by a compressor may be adjusted so that the column of water produced by a given diffuser is laminar. In another example, the depth of the body of water may require a higher pressure, but lower volume compressor in order to create a column of bubbles that remains laminar as it rises. In another example, the size of the orifice in a diffuser may be made smaller in shallower applications to prevent coalescing of the bubbles. In another example, the spacing of the orifices in a diffuser may be spread apart to prevent coalescing of the bubbles in deeper applications. An example of a membrane diffuser is part number DD-P-6 Duraplate Weighted Fine Bubble Membrane Diffuser manufactured by Keeton Industries, Fort Collins, Colo.

The upward motion of the bubbles, especially with laminar flow systems, causes the water to rise as well, forming a column of moving water which forces circulation of the water. The circulation destratifies the water and mixes the water with lower oxygen content at the bottom of the lake 108 with the higher oxygen content water normally at the top. The destratification makes the entire body of water more suitable for fish, since a larger portion of the water has higher oxygen content than prior to aeration. Further, all areas of the body of water benefit from the higher oxygen content, including reduction in algae and undesirable microbes and increase of desirable microbes.

Figure 2:
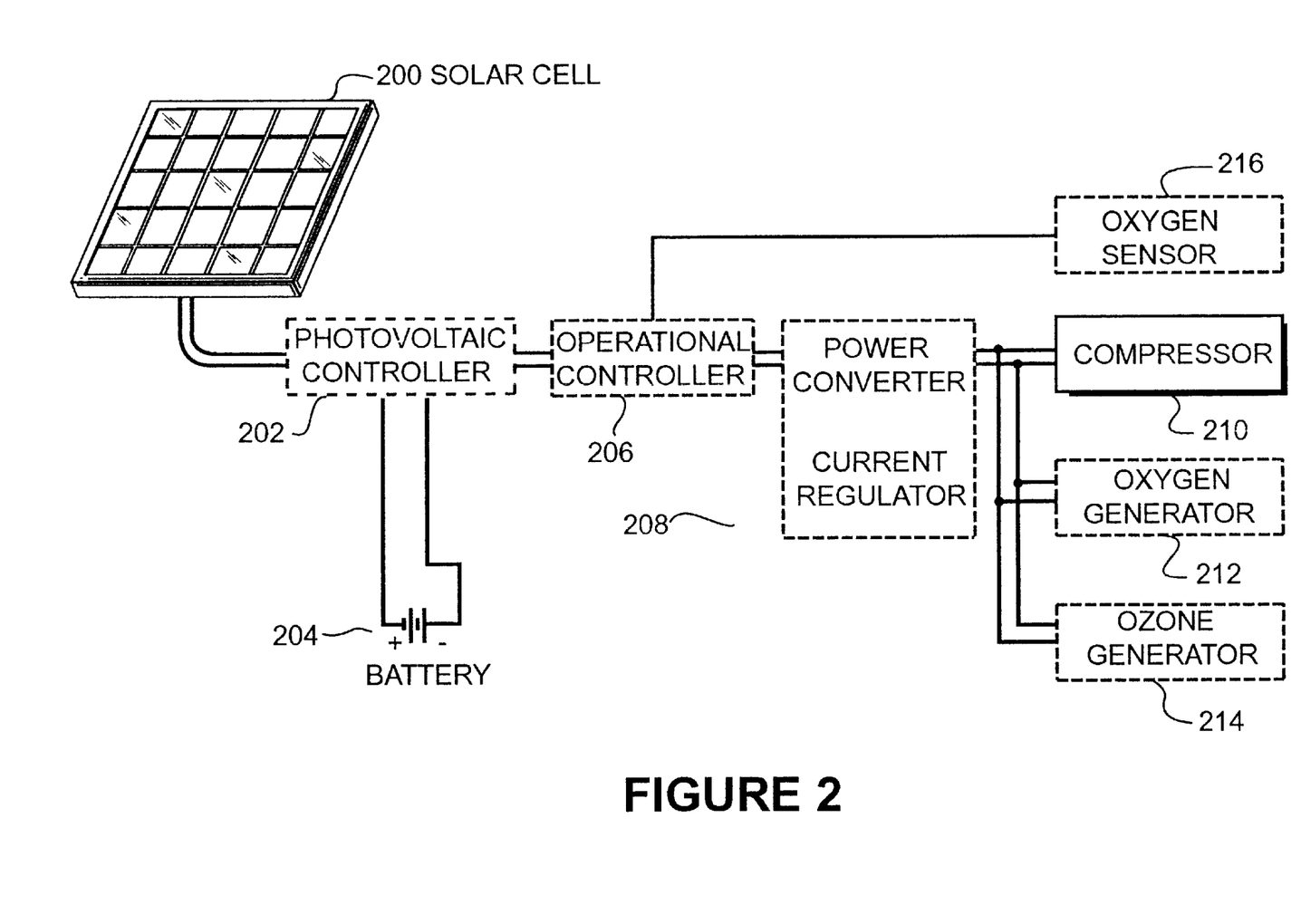
FIG. 2 is a block diagram of the electrical components of an embodiment of the inventive aerator.

FIG. 2 illustrates a block diagram of the electrical components of an embodiment of the invention. Solar array 200 is the primary energy source for the device and is connected to a photovoltaic controller 202, which is connected to battery 204 and timer 206. Operational controller 206 is connected to current regulator 208 that is connected to compressor 210, oxygen generator 212, and ozone generator 214. Oxygen sensor 216 is connected to operation controller 206.

Solar array 200 supplies power to photovoltaic controller 202 in proportion to the amount of sunlight that is impinging on the surface of the solar array 200. Photovoltaic controller 202 receives the variable energy and charges battery 204. If there is a current draw by the compressor 210 or one of the other load devices such as the oxygen generator 212 or ozone generator 214, the photovoltaic controller 202 supplies energy to those devices at the battery voltage. The photovoltaic controller 202 draws energy from solar array 200 to meet the current draw and supplements the energy need from the battery 204. The photovoltaic controller may be a microprocessor-controlled device, a state machine, or other electrical component that interfaces between a solar panel, a battery, and a load. An example of a photovoltaic controller is part number CSS-1-Prostar 20 manufactured by Morning Star Corporation, Olney, Md.

Solar array 200 and battery 202 are selected such that the energy supplied by the solar array 200 and the energy stored in the battery 202 is sufficient to power the entire device for the duration of a day, plus enough reserve for days of limited or no sunshine. Depending on the application, around the clock operation or only periodic operation may be desired. Solar array 200 may comprise one or more solar panels. The quantity and size of the solar panels is dependent on the application. Battery 202 may comprise one or more physical batteries connected in series or in parallel. The quantity, size, and connection of the batteries are dependent on the application. The batteries may be gel-type, lead acid, nickel cadmium, lithium ion, or any other type of rechargeable battery. An example of a gel-type deep cycle storage battery is part number DSSB-1 manufactured by East Penn Manufacturing, Lyons Station, Pa. The specific type of battery may be different depending on the application. For example, certain types of batteries, such as nickel cadmium, do not perform well when they are not fully discharged between charging. Such batteries would be acceptable when the aerator is designed to run to exhaustion during a nighttime period, but not as desirable when the cycling is more frequent during the day.

Current regulator 208 is used to condition and convert the battery voltage to the voltage required for the load devices, compressor 210, oxygen generator 212, and ozone generator 214. Current regulator 208 is an optional device that may not be needed in some embodiments of the invention. Further, current regulator 208 may consist of any electronic circuitry or component that conditions the energy from the photovoltaic controller 202 prior to the load devices. An example of a current regulator is CRS-1 manufactured by Solar Converters, Incorporated, Guelph, Ontario, Canada.

Compressor 210 is the electromechanical device that supplies pressurized air to the diffuser 106. The compressor 210 is selected to match the diffuser 106 with the desired performance of the present invention to maximize efficiency. In general, compressor 210 is selected so that the flow from diffuser 106 yields a laminar flow of bubbles. In some cases, a turbulent flow of bubbles is desired and a higher capacity compressor 210 is selected especially when maximized efficiency is not required. Compressor 210 may consist of one or more actual compressors. The compressors may be connected in series or in parallel, depending on the compressor design and the application requirements. The selection of an appropriate compressor for a specific application depends on the depth of the diffuser at the bottom of the water body, the length of pipe to the diffuser, and the size of the diffuser. In general, a compressor is selected to deliver a certain flow of air at a certain pressure. The pressure is generally dependent on the depth of the diffuser and the flow is generally dependent on the size of the diffuser. The compressors are generally selected to deliver a laminar flow for a certain diffuser for maximum efficiency. An example of a compressor for shallow ponds is part number DP102-24VBLDC manufactured by Medo, USA, Incorporated, Hanover Park, Ill.

Oxygen generator 212 is an optional device that removes nitrogen from compressed air and yields a gas with a higher concentration of oxygen, up to 95% oxygen. The use of an oxygen generator in an aeration system will increase the oxygenation of the water by three times or more. However, the additional cost and energy draw of the oxygen generator 212 must outweigh the need for additional oxygenation. One or more oxygen generators may be used in various embodiments of the invention. The oxygen generators may be connected singularly to each air compressor or they may be connected in parallel to each other fed by a manifold. Other plumbing configurations may be utilized without deviating from the spirit of the present invention.

Ozone generator 214 is another optional device that creates ozone from gaseous oxygen. Ozone generator 214 may be used in conjunction with oxygen generator 212 or without. When low levels of ozone are added to a conventional aerator system, the oxygenation of the water is enhanced by orders of magnitude. One or more ozone generators may be used in various embodiments of the invention. The ozone generators may be connected singularly to each air compressor or oxygen generator, or they may be connected in parallel to each other fed by a manifold. Other plumbing configurations may be utilized without deviating from the spirit of the present invention.

Operational controller 206 is an optional device that may have varying complexity. In a simple form, operational controller 206 may be a simple timer that is programmed to turn on and off at predetermined times. In a more complex form, operational controller 206 may be a programmed controller connected to an oxygen sensor 216 that is located in the water and senses the oxygen levels of the water. The input from sensor 216 may be used to turn the system on and off to keep the oxygen levels above a minimum level. The controller may be connected to other sensors and devices for diagnostic, monitoring, and data storage purposes. Further, additional sensors and control logic may be employed to optimize the system's performance due to changing weather conditions, system integrity, and water conditions. The controller may also be attached to sunlight sensors for assessing the amount of natural sunlight is impinging the water body, or to other sensors for better tailoring the oxygenation of the water to suit the individual application. The controller may be coupled to a pressure sensor that detects the back pressure of the air supplied to the diffuser, and may adjust the compressors to maximize efficiency and create laminar flow. Alternatively, the controller may generate turbulent flow at certain times, such as high sunlight when extra power is available from the solar panels. The sensor and control technology may be expanded by those skilled in the art without deviating from the inventive device. An example of a basic timer that controls start and stop times is part number DT-1 manufactured by Borg General Controls, Elk Grove, Ill.

Figure 3:
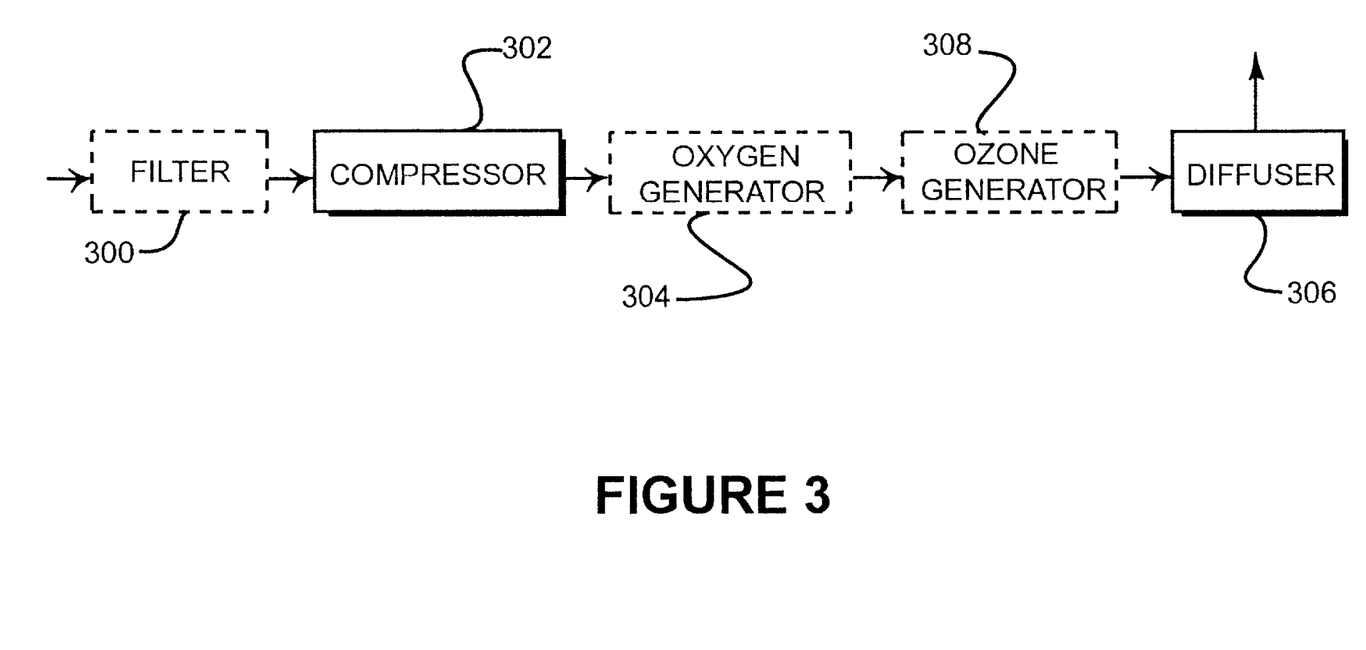
FIG. 3 is a block diagram of the pneumatic components of an embodiment of the inventive aerator.

FIG. 3 illustrates the air circuit of an embodiment of the invention. Air enters filter 300 prior to entering compressor 302, followed by oxygen generator 304, ozone generator 306, and diffuser 308. Filter 300 is selected depending on the application and is designed to protect the internal mechanisms of the downstream components as well as to prevent clogging of the diffuser 308.

Figure 4:
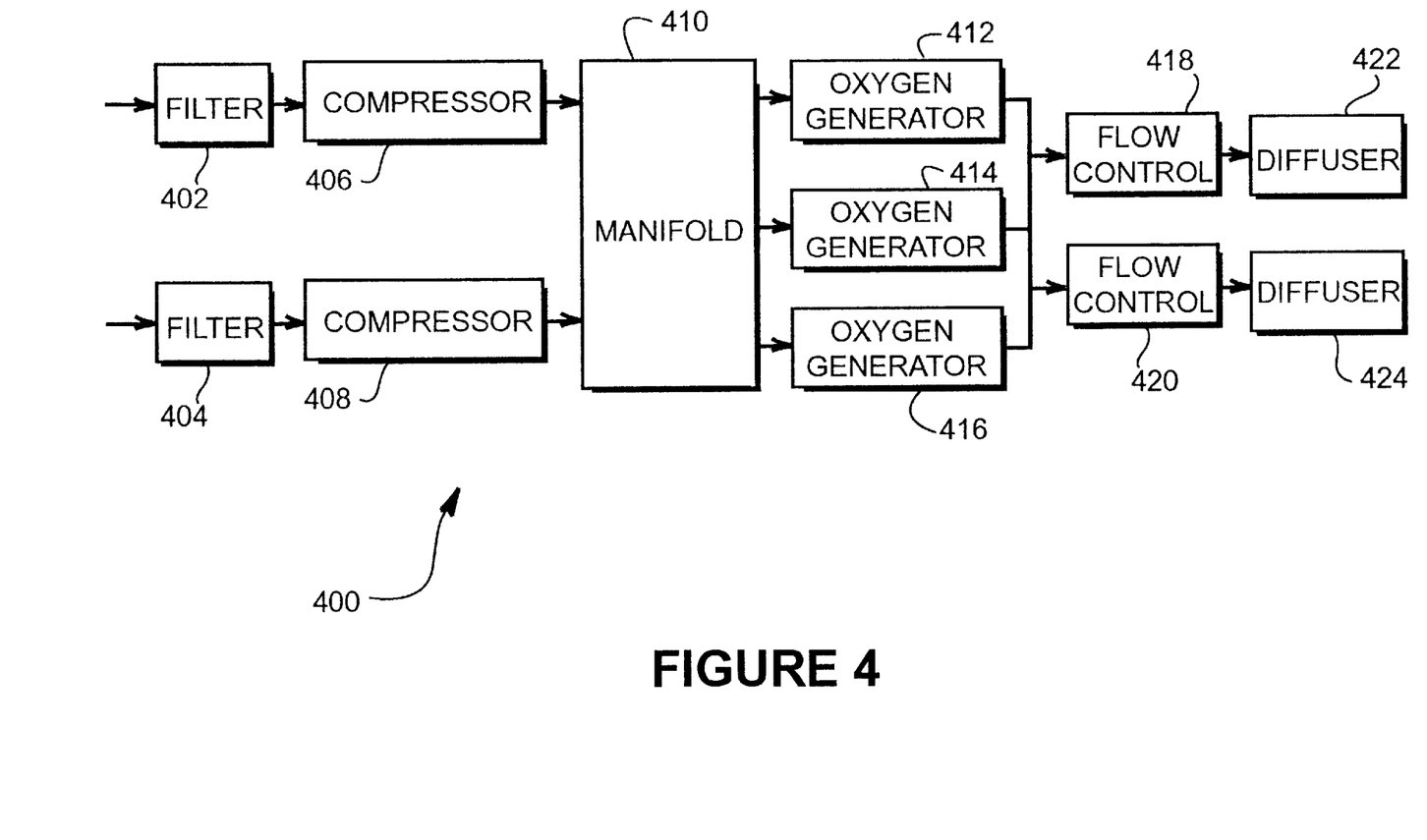
FIG. 4 is a block diagram of the pneumatic components of a second embodiment of the inventive aerator.

FIG. 4 illustrates an embodiment 400 of the invention wherein two compressors, three oxygen generators, and two diffusers are used. Air enters the system through filters 402 and 404, each of which is in communication with air compressors 406 and 408, respectively. The two compressors 406 and 408 exhaust into manifold 410. Manifold 410 serves to balance the air volume between the three oxygen generators, 412, 414, and 416. The output from the oxygen generators feeds two flow controls, 418 and 420, which in turn feed diffusers 422 and 424. The flow controls 418 and 420 are a method whereby the user may adjust the flow to each diffuser. For example, if one diffuser is at a lower depth than a second diffuser, the first one is be adjusted to have more flow that the second so that both diffusers create a laminar column of bubbles. In some applications, another set of filters or other air preparation equipment may be installed between the oxygen generators 412, 414, and 416 and the flow controls 418 and 420.

Figure 5:
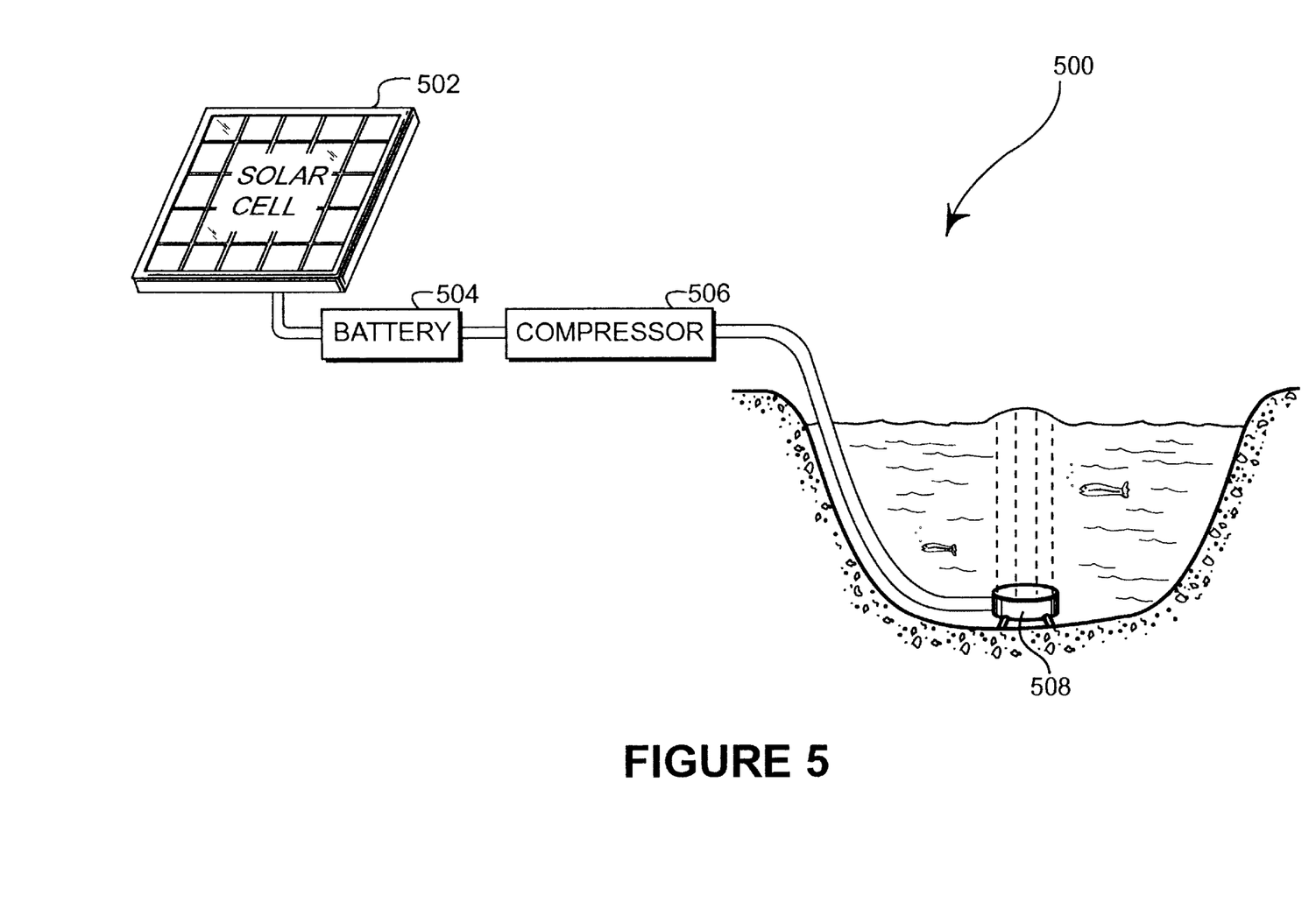
FIG. 5 is a block diagram of a third embodiment of the inventive aerator.

FIG. 5 illustrates an embodiment 500 of the invention in a simple form. Solar panel 502 is connected to a battery 504 and a compressor 506. Compressor 506 supplied air to a diffuser 508. Solar panel 502 is a constant voltage type panel.

Battery 504 and solar panel 502 are selected for the particular operating cycle required for the application. For example, for a device that is designed to run during daylight hours plus some time after sunset, a small solar panel 502 may be matched with a small battery 504. Such a device begins running in the morning when the sun provides enough power to begin charging the battery, and continues charging the battery throughout the day. After sunset, the battery runs the compressor 506 until its energy is depleted. Such a system has the advantage of low cost and simplicity.

Another example would be a device designed to run continuously, wherein the daily output of the solar panel 502 would be sufficient to generate enough power for two or three complete day's worth of operation and the battery 504 would be sufficient to store enough energy for two or three day's worth of operation. Such a device would be able to operate continually even with two or three days of limited sunshine, yet would have additional cost.

Figure 6:
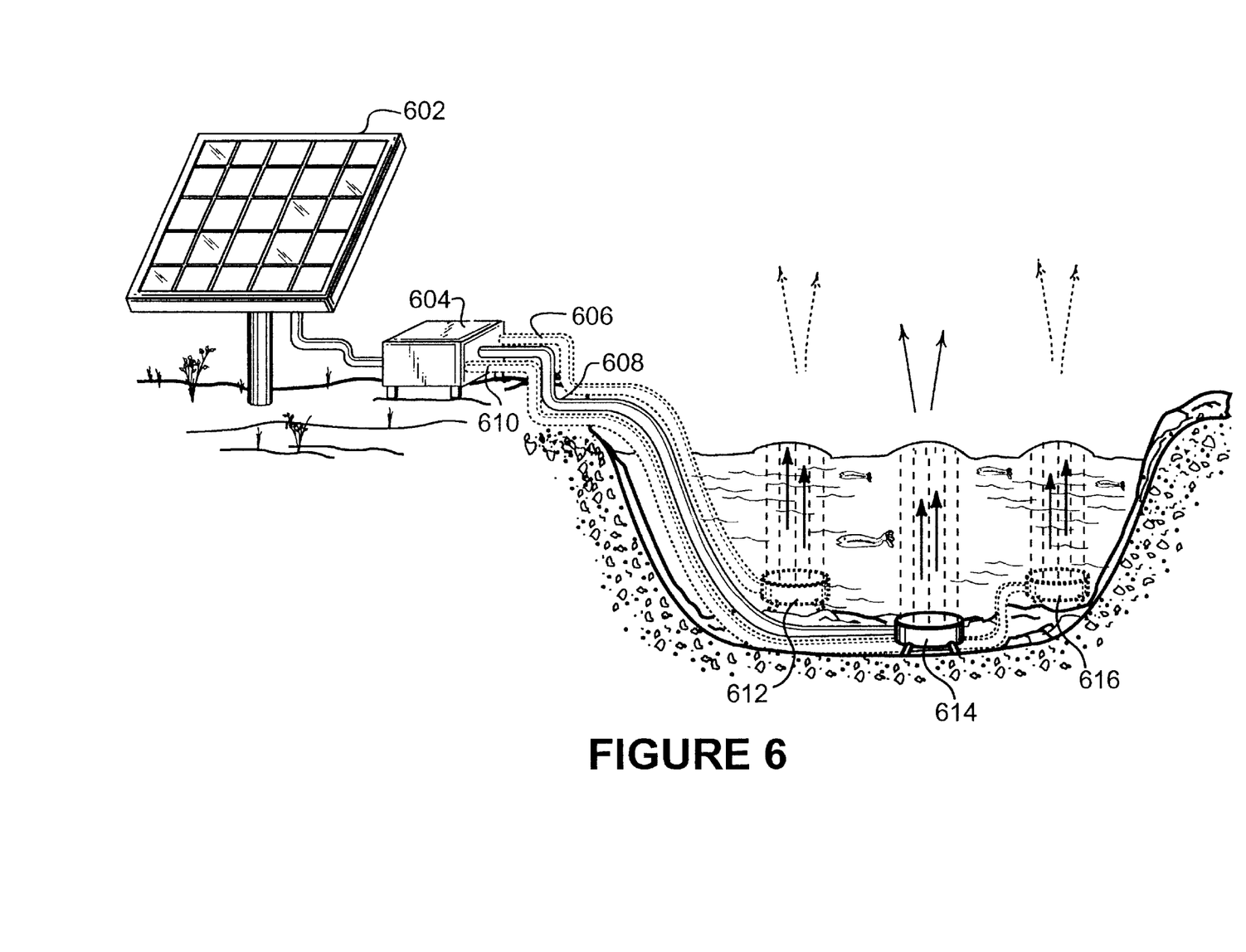
FIG. 6 is an embodiment with multiple diffusers.

FIG. 6 illustrates an embodiment of the present invention wherein multiple diffusers are used at different depths of a large water body. Solar panel 602 is attached to FIG. 6 illustrates an embodiment of the present invention wherein multiple diffusers are used at different depths of a large water body. Solar panel 602 is electrically attached to control box 604, which has three lengths of air pipe 606, 608, and 610 attached thereto. Three diffusers, 612, 614, and 616 are each attached to one of the air pipes 606, 608, and 610. Each diffuser 612, 614, and 616 are at different depths in the water body.

In order for each diffuser 612, 614, and 616 to operate efficiently, flow controls, flow meters, valves, regulators, or other devices are used in the control box 604 to regulate the appropriate amount of airflow for each diffuser. For a diffuser at a shallow depth, the flow may need to be restricted. For a diffuser at a deeper depth, the flow may need to be increased. A technician in the field may adjust the flow rates to each diffuser individually to achieve a laminar water column in each of the diffusers.

A system with multiple diffusers is applicable to larger water bodies. Multiple diffusers can further enhance the water circulation and oxygen transfer, since the circulation points may be dispersed and thus more water may be entrained in the water column.

The present invention therefore provides a solar powered aeration system that incorporates battery storage. The battery storage allows the aeration system to operate at times when the oxygen is needed most in the body of water, which is often at night. The system may be designed to run continuously or intermittently, depending on the applications.

The solar power for the device allows a water body to be aerated away from the conventional electrical power grid. Further, no fuel needs to be replenished for the operation of the device to continue. Thus, the device is applicable to remote locations and to applications where the recurring cost of fuels or electricity is high.

The present invention may have a controller that can operate the device at predetermined times. The controller may use sensors to detect low oxygen levels, backpressure, sunlight, and other factors that can be taken into account when determining when to operate the device.

The present invention may have an optional oxygen generator attachment that increases the oxygen absorption of the water significantly. Further, an ozone generator may be installed in place of or in addition to the oxygen generator, significantly increasing oxygen absorption. The ozone generator and oxygen generator may be useful in applications where there is severely low oxygen levels or high levels of organic matter in the water body.

The present invention utilizes a laminar flow column of fine air bubbles to maximize oxygen transfer. The fine air bubbles enhance oxygen transfer by having a larger surface area per volume of air. Further, the laminar flow column enhances circulation more so than a turbulent flow diffuser because more water is entrained in the rising column of air bubbles. The laminar flow is a slower flow than slug flow, which increases efficiency since the bubbles are in the water for a longer time. The laminar flow column is formed by matching the diffuser capacity, the air compressor capacity, and the pressure drop of the air line in such a manner that the air bubble and water column from the diffuser is laminar. The matching of the components, plus the laminar flow transfers the most oxygen to the body of water for the energy supplied to the system. The maximizing of efficiency is important in solar applications since the price of the solar panels is high.

The location of the diffuser at the bottom of the body of water, coupled with the efficient circulation of the laminar flow column, effectively destratifies the body of water. Destratified water minimizes areas of the body of water that are less likely to support aquatic life, increasing the capacity of the body of water to support fish and other desirable life forms.

All of the electrical components, including any control devices, are mounted on the shore of the body of water, and the only part of the system in the water is the diffuser and the air line attached thereto. Since the components are located on the shore, they are easy to service and require less protection than if they were mounted on a floating platform or underwater. The solar panel especially benefits from mounting on land, since the mounting apparatus may be firmly fixed to the ground and not moved during high winds or other weather.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A solar powered device for aerating a body of water having a depth comprising:
   at least one solar power source being electrically connected to at least one battery being electrically connected to at least one air compressor, said air compressor having a range of maximum efficiency;
   at least one diffuser that is pneumatically connected to said air compressor, said diffuser being mounted in said body of water at said depth and providing a backpressure at said depth of said body of water to said air compressor such that said backpressure enables said air compressor to operate within said range of maximum efficiency and enables said diffuser to produce a substantially laminar water column, said diffuser having a plurality of holes spaced at a predetermined spacing and sufficiently small so as to minimize coalescing of bubbles produced at said depth by said diffuser;
   said device being adapted to produce said substantially a laminar water column.

2. The device of claim 1 further comprising: a controller electrically connected between said battery and said air compressor for the purpose of turning said air compressor on and off.

3. The device of claim 2 further comprising: an oxygen sensor mounted in said body of water electrically connected to said controller whereby the signal from said sensor is used by said air controller to turn on and off said air compressor to maintain the oxygen level of said body of water above a predetermined level.

4. A solar powered device for aerating a body of water having a depth comprising:
   at least one solar power source being electrically connected to at least one battery being electrically connected to at least one air compressor;
   at least one oxygen generator being electrically connected to said battery and pneumatically connected to said air compressor, said air compressor having a range of maximum efficiency;
   at least one diffuser that is pneumatically connected to said oxygen generator, said diffuser being mounted in said body of water at said depth and providing a backpressure at said depth of said body of water to said air compressor such that said backpressure enables said air compressor to operate within said range of maximum efficiency and enables said diffuser to produce a substantially laminar water column, said diffuser having a plurality of holes spaced at a predetermined spacing and sufficiently small so as to minimize coalescing of bubbles produced at said depth by said diffuser; and
   said device being adapted to produce said substantially laminar water column.

5. The device of claim 4 further comprising: a controller electrically connected between said battery and said air compressor for the purpose of turning said air compressor on and off.

6. The device of claim 5 further comprising: an oxygen sensor mounted in said body of water electrically connected to said controller whereby the signal from said sensor is used by said controller to turn on and off said air compressor to maintain the oxygen level of said body of water above a predetermined level.

7. A solar powered device for aerating a body of water having a depth comprising:
   at least one solar power source being electrically connected to at least one battery being electrically connected to at least one air compressor, said air compressor having a range of maximum efficiency;
   at least one ozone generator being electrically connected to said battery and pneumatically connected to said air compressor;
   at least one diffuser that is pneumatically connected to said ozone generator, said diffuser being mounted in said body of water at said depth and providing a backpressure at said depth of said body of water to said air compressor such that said backpressure enables said air compressor to operate within said range of maximum efficiency and enables said diffuser to produce a substantially laminar water column, said diffuser having a plurality of holes spaced at a predetermined spacing and sufficiently small so as to minimize coalescing of bubbles produced at said depth by said diffuser; and
   said device being adapted to produce said substantially laminar water column.

8. The device of claim 7 further comprising: a controller electrically connected between said battery and said air compressor for the purpose of turning said air compressor on and off.

9. The device of claim 8 further comprising: an oxygen sensor mounted in said body of water electrically connected to said controller whereby the signal from said sensor is used by said controller to turn on and off said air compressor to maintain the oxygen level of said body of water above a predetermined amount.

10. A solar powered device for aerating a body of water having a depth comprising:
    at least one solar power source being electrically connected to at least one battery being electrically connected to at least one air compressor;
    at least one oxygen generator being electrically connected to said battery and pneumatically connected to said air compressor;
    at least one ozone generator being electrically connected to said battery and pneumatically connected to said oxygen generator;
    at least one diffuser that are pneumatically connected to said ozone generator, said diffuser being mounted in said body of water at said depth and providing a backpressure at said depth of said body of water to said air compressor such that said backpressure enables said air compressor to operate within said range of maximum efficiency and enables said diffuser to produce a substantially laminar water column, said diffuser having a plurality of holes spaced at a predetermined spacing and sufficiently small so as to minimize coalescing of bubbles produced at said depth by said diffuser; and
    said device being adapted to produce said substantially laminar water column.

11. The device of claim 10 further comprising: a controller electrically connected between said battery and said air compressor for the purpose of turning said air compressor on and off.

12. The device of claim 11 further comprising: an oxygen sensor mounted in said body of water electrically connected to said controller whereby the signal from said sensor is used by said controller to turn on and off said air compressor to maintain the oxygen level of said body of water above a predetermined level.

13. A method for aerating a body of water having a depth using solar energy comprising:

creating electrical energy using a solar panel;

charging an electrical battery connected to said solar panel;

compressing air with an air compressor connected to said battery;

communicating said air to a diffuser via a pipe;

diffusing said air into said body of water with a diffuser at said depth and providing a backpressure at said depth of said body of water to said air compressor such that said backpressure enables said air compressor to operate within said range of maximum efficiency and enables said diffuser to produce a substantially laminar water column, said diffuser having a plurality of holes spaced at a predetermined spacing and sufficiently small so as to minimize coalescing of bubbles produced at said depth by said diffuser; and creating an aerating laminar bubble column in said body of water so as to maximize efficiency.

14. The method of claim 13 further comprising the step of controlling said air compressor with a controller electrically connected between said battery and said compressor.

15. A solar powered device for aerating a body of water having a depth comprising:

at least one solar power source;

at least one battery being electrically connected to said at least one solar power source;

at least one air compressor electrically connected to said at least one battery, said compressor having a range of maximum efficiency;

at least one diffuser that is pneumatically connected to said air compressor, said diffuser being mounted in said body of water at said depth and providing a backpressure at said depth of said body of water to said air compressor such that said backpressure enables said air compressor to operate within said range of maximum efficiency and enables said diffuser to produce a substantially laminar water column; and a controller electrically connected between said battery and said air compressor for the purpose of turning said air compressor on and off.

16. A method for constructing a solar powered device for aerating a body of water having a depth comprising:

selecting at least one solar power source;

selecting at least one battery;

connecting said at least one battery to said at least one solar power source;

selecting at least one air compressor having a range of maximum efficiency;

connecting said air compressor to said at least one battery;

selecting at least one diffuser that is sized to provide a backpressure at said depth of said body of water to said compressor such that said compressor operates within said range of maximum efficiency, said diffuser further having a plurality of holes spaced so as to minimize coalescing of bubbles produced by said diffuser;

connecting said at least one diffuser to said air compressor;

mounting said diffuser in said body of water;

selecting a controller; and connecting said controller to said battery and said air compressor such that said controller may turn said air compressor on and off.

\* \* \* \* \*